United States Patent
Kudo

(10) Patent No.: US 8,991,457 B2
(45) Date of Patent: Mar. 31, 2015

(54) STEEL CORD FOR REINFORCEMENT OF RUBBER ARTICLES AND PNEUMATIC TIRE USING THE SAME

(75) Inventor: Eiji Kudo, Nasushiobara (JP)

(73) Assignee: Bridgestone Corporation, Tokyo (JP)

( * ) Notice: Subject to any disclaimer, the term of this patent is extended or adjusted under 35 U.S.C. 154(b) by 346 days.

(21) Appl. No.: 12/997,387

(22) PCT Filed: Jun. 12, 2009

(86) PCT No.: PCT/JP2009/060804
§ 371 (c)(1),
(2), (4) Date: Dec. 10, 2010

(87) PCT Pub. No.: WO2009/151127
PCT Pub. Date: Dec. 17, 2009

(65) Prior Publication Data
US 2011/0088825 A1    Apr. 21, 2011

(30) Foreign Application Priority Data
Jun. 13, 2008 (JP) .................. 2008-155606

(51) Int. Cl.
*B60C 9/00* (2006.01)
*D07B 1/06* (2006.01)
*D02G 3/28* (2006.01)

(52) U.S. Cl.
CPC ............ *D07B 1/0613* (2013.01); *B60C 9/0007* (2013.01); *D07B 2201/2006* (2013.01);
(Continued)

(58) Field of Classification Search
USPC ............ 152/451, 527, 556; 57/214, 218, 237, 57/902
IPC ...................... D02G 3/28; D07B 1/06
See application file for complete search history.

(56) References Cited

U.S. PATENT DOCUMENTS 3,413,799 A    12/1968    Lejeune
6,863,103 B1    3/2005    Masubuchi et al.
(Continued)

FOREIGN PATENT DOCUMENTS

CN    1745187 A    3/2006
EP    1 479 535 A2    11/2004
(Continued)

OTHER PUBLICATIONS

English language machine translation of JP2008-150757, 2008.*
(Continued)

*Primary Examiner* — Justin Fischer
*Assistant Examiner* — Philip N Schwartz
(74) *Attorney, Agent, or Firm* — Sughrue Mion, PLLC

(57) ABSTRACT

A steel cord for reinforcement of rubber articles, whose cord strength is enhanced by preventing occurrence of preceding break of the outermost layer filaments in the steel cord having a multi-twisted structure, and a pneumatic tire using it as a reinforcing material are provided.
In a steel cord for reinforcement of rubber articles having a multi-twisted structure in which a plurality of strands are twisted together, which strands have a layered twisted structure in which a plurality of steel filaments are twisted together, dc/ds, which represents the ratio between dc, the diameter of outermost layer sheath filaments constituting the outermost layer sheath of a core strand, and ds, the diameter of outermost layer sheath filaments constituting the outermost layer sheath of sheath strands, is 1.05 to 1.25.

5 Claims, 2 Drawing Sheets

(52) U.S. Cl.
 CPC . *D07B2201/2051* (2013.01); *D07B 2201/2061* (2013.01); *D07B 2205/3057* (2013.01); *B60C 2200/06* (2013.01); *D07B 2201/1044* (2013.01); *D07B 2201/1052* (2013.01); *Y10S 57/902* (2013.01)
 USPC .............................. 152/451; 57/237; 57/902

(56) References Cited

U.S. PATENT DOCUMENTS

| | | | |
|---|---|---|---|
| 2004/0045652 A1* | 3/2004 | Vanneste et al. | 152/451 |
| 2006/0137776 A1 | 6/2006 | Yamasaki et al. | |
| 2009/0205308 A1* | 8/2009 | Aoyama | 57/212 |

FOREIGN PATENT DOCUMENTS

| | | | | |
|---|---|---|---|---|
| JP | 2002-030586 A | | 1/2002 | |
| JP | 2002-339277 A | | 11/2002 | |
| JP | 3439329 A | | 6/2003 | |
| JP | 3709551 A | | 8/2005 | |
| JP | 2005-248373 A | | 9/2005 | |
| JP | 2006-104636 A | | 4/2006 | |
| JP | 2007-107136 A | | 4/2007 | |
| JP | 2008150757 A | * | 7/2008 | ............... D07B 1/06 |
| WO | 01/34900 A1 | | 5/2001 | |
| WO | WO2008026271 | * | 3/2008 | ............... D07B 1/06 |

OTHER PUBLICATIONS

International Search Report issued in PCT/JP2009/060804 dated Oct. 6, 2009 (4 pages).

Japanese Office Action, dated Jul. 26, 2013, issued in corresponding Japanese Patent Application No. 2008-155606.

Anonymous:' High Tensile Strength Steel Cord Constructions for Tyres, Research Disclosure, Mason Publications, Hampshire, GB, vol. 340, No. 54, (Aug. 1, 1992), XP007118007, ISSN: 0374-4353.

Wolf et al. "Alternative Konstruktionen von Stahlzugtragern in Fordergurten", Kautschuk and Gummi-Kunststoffe, Huthig Verlag, Heidelberg, DE, vol. 46, No. 9, (Sep. 1, 1993), pp. 727-731, XP000397379, ISSN: 0948-3276.

European Search Report dated Apr. 8, 2014 issued in corresponding EP application 09 762 557.8.

* cited by examiner

STEEL CORD FOR REINFORCEMENT OF RUBBER ARTICLES AND PNEUMATIC TIRE USING THE SAME

TECHNICAL FIELD

The present invention relates to a steel cord for reinforcement of rubber articles and a pneumatic tire using it (hereinafter also simply referred to as "cord" and "tire"), more concretely, a steel cord for reinforcement of various rubber articles such as pneumatic tires and conveyer belts, and a pneumatic tire using it.

BACKGROUND ART

In general, steel cords used for reinforcement of carcass plies and belt plies in tires for construction vehicles and reinforcement of conveyer belts require high strength. Therefore, for these uses, a steel cord having a multi-twisted structure wherein strands having a plurality of steel filaments twisted together are further twisted together, is widely used.

On the other hand, to meet the demands related to environmental problems and improvement of energy efficiency in recent years, tires are demanded to achieve increase in the fuel efficiency and suppression of the cost of transportation by weight saving and reduction of the rolling resistance. Therefore, as a means to increase the strength of a steel cord, enhancement of the strength of filaments was attempted by changing the quality of their material (especially, carbon content) and/or the method of manufacturing thereof (e.g., reduction of area).

However, although a conventional method which enhances the cord strength by enhancement of the tensile strength of filaments was effective for a steel cord having a single-twisted structure or a normal layered twisted structure, it was not sufficiently effective for a steel cord having a multi-twisted structure comprising strands in which a plurality of steel filaments are twisted together. This is because, in such a cord having a multi-twisted structure, an increase in the filament strength is not directly linked to an increase in the cord strength, depending on the state of contact among the strands or the filaments. Thus, to solve this problem, various improvements have been carried out so far.

In terms of improvement of a steel cord having a multi-twisted structure, for example, Patent Document 1 discloses a technology for a steel cord for reinforcement of rubber, which steel cord has a 7×19 structure constituted by (1+6+12)+6×(1+6+12), to obtain a high cord strength by prescribing the tensile strength of filaments in the outermost layer of sheath strands and the tensile strength of filaments in the adjacent inner layer such that a specific ratio is attained between these. Further, Patent Document 2 discloses a technology for a steel cord for reinforcement of rubber articles, which steel cord has a multi-twisted structure, to obtain a high cord strength by setting the tensile strength of outermost layer sheath filaments constituting strands to not more than 3,040 N/mm$^2$ and the tensile strength of all the inner filaments other than the outermost layer sheath filaments to not less than 3,140 N/mm$^2$.

Further, Patent Document 3 discloses a technology to obtain a high cord strength by employing outermost layer filaments constituting strands thicker than the filaments in the inner side thereof to avoid preceding break of the outermost layer filaments. Patent Document 4 discloses a technology to obtain a high cord strength by prescribing the tensile strength of the filaments constituting each strand as "the filament tensile strength of the layer close to the center of the strand≥the filament tensile strength of the layer distant from the center of the strand" and the average tensile strength of the strands as "the average tensile strength of the strands in the layer close to the center of the cord<the average tensile strength of the strands in the layer distant from the center of the cord" to prevent preceding break of filaments.

RELATED ART REFERENCES

Patent Documents

Patent Document 1: Japanese Patent No. 3439329 (Claims and the like)
Patent Document 2: Japanese Patent No. 3709551 (Claims and the like)
Patent Document 3: Japanese Unexamined Patent Application Publication (Translation of PCT Application) No. 01/034900 (Claims and the like)
Patent Document 4: Japanese Unexamined Patent Application Publication No. 2005-248373 A (Claims and the like)

DISCLOSURE OF THE INVENTION

Problems to be Solved by the Invention

Among these, in the steel cord described in Patent Document 2, the tensile strength of the outermost layer sheath filaments constituting strands is set to not more than 3,040 N/mm$^2$ and the tensile strength of all the inner filaments other than the outermost layer sheath filaments are set to not less than 3,140 N/mm$^2$, but in the 3+9, 3+9+15 and 1+6+12 structures which are standard strand structures, the number of the outermost layer sheath filaments accounts for not less than a half of the total number of the filaments. Therefore, in these strand structures, even if the filament strength of the inner layer is increased by 10% aiming to further enhance the strength, the total cord strength is increased by only not more than 5% which is a half of the level of the enhancement.

That is, a conventional method wherein the cord strength is enhanced by enhancement of the tensile strength of filaments is effective for a steel cord having a single-twisted structure or a normal layered twisted structure, and also effective for a steel cord having a multi-twisted structure wherein a plurality of steel filaments are twisted together to form each strand in cases where the tensile strength of the filaments is not more than 3,040 N/mm$^2$, but with a tensile strength higher than this, an increase in the cord strength comparable to the increase in the tensile strength of the filaments cannot be obtained, which has been problematic.

Further, the steel cord described in Patent Document 3 has also been applied to actual tires, and by employing outermost layer filaments constituting each strand thicker than the filaments in the inner side thereof, its effect is sufficiently exerted immediately after the production and a steel cord having a high strength can be obtained. On the other hand, however, in cases where it is stored for a long time and in cases where it is influenced by the thermal history during production of a tire, the cord strength greatly decreases relative to that immediately after the production, which has been problematic.

Further, in the steel cords described in Patent Document 1 and Patent Document 4, strong cord strength can be obtained, but the problem of preceding break of the outermost layer filaments cannot be solved sufficiently.

That is, by a conventional technology, in a steel cord having a multi-twisted structure, the problem of preceding break of the outermost layer filaments upon attempting to further enhance the cord strength cannot be solved sufficiently, so that attainment of a superior improvement technology has been demanded.

Thus, the present invention aims to provide a steel cord for reinforcement of rubber articles, whose cord strength is enhanced, without causing problems such as those in the above-described conventional arts, by preventing occurrence of preceding break of the outermost layer filaments in a steel cord having a multi-twisted structure, and a pneumatic tire using it as a reinforcing material.

Means for Solving the Problems

To solve the above problems, the present inventor intensively studied a method for improving the cord strength of a steel cord having a multi-twisted structure in consideration also of long-term storage and influence of the thermal history during tire vulcanization, and discovered that, by setting dc/ds, which represents the ratio between dc, the diameter of outermost layer sheath filaments constituting the outermost layer sheath of a core strand, and ds, the diameter of outermost layer sheath filaments constituting the outermost layer sheath of sheath strands, to 1.05 to 1.25, the shear stress due to the contact load to the outermost layer filaments of the core strand which may cause preceding break can be reduced and hence the preceding break can be suppressed, leading to enhancement of the cord strength, thereby completing the present invention.

That is, the steel cord for reinforcement of rubber articles of the present invention is a steel cord for reinforcement of rubber articles having a multi-twisted structure in which a plurality of strands are twisted together, the strands having a layered twisted structure in which a plurality of steel filaments are twisted together, wherein dc/ds, which represents the ratio between dc, the diameter of outermost layer sheath filaments constituting the outermost layer sheath of a core strand, and ds, the diameter of outermost layer sheath filaments constituting the outermost layer sheath of sheath strands, is 1.05 to 1.25.

In the present invention, the twist angle of the sheath strand, among the above strands, is preferably not less than 1.4 rad, and the direction of twist of the outermost layer sheath filaments constituting the outermost layer sheath of the core strand and the direction of twist of the sheath strands are preferably the same. Further, preferably, the tensile strength of all the filaments constituting the strands are not less than 3,040 N/mm$^2$. Further, also preferably, the carbon contents of the filaments constituting the strands are not less than 0.80% by weight.

The pneumatic tire of the present invention is characterized in that the above-described steel cord for reinforcement of rubber articles of the present invention is employed as its reinforcing material.

Effect of the Invention

According to the present invention, by employing the above-described constitution, occurrence of preceding break at contact portions among outermost layer filaments of a steel cord having a multi-twisted structure can be suppressed, thereby enabling realization of a steel cord for reinforcement of rubber articles, which has a higher cord strength than before. Thus, by employing the steel cord for reinforcement of rubber articles of the present invention as a reinforcing material for a pneumatic tire, a pneumatic tire which can realize all of weight saving, increase in the fuel efficiency and suppression of the cost of transportation can be obtained.

BEST MODE FOR CARRYING OUT THE INVENTION

Figure 1:
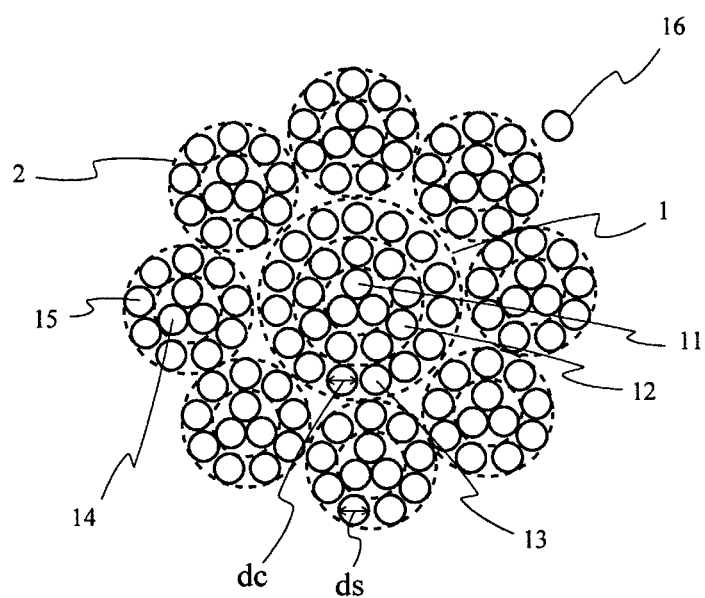
FIG. 1 is a cross-sectional view showing a steel cord for reinforcement of rubber articles as one preferred example of the present invention.

Preferred embodiments of the present invention will be described in detail referring to the drawings.

The steel cord for reinforcement of rubber articles of the present invention has a multi-twisted structure in which a plurality of strands are twisted together, the strands having a layered twisted structure in which a plurality of steel filaments are twisted together.

As mentioned above, a steel cord having a relatively small diameter such as one having a single-twisted structure or a normal layered twisted structure has a cord strength determined by tensile strength of individual filaments. However, as described above, in the case of a steel cord having a multi-twisted structure wherein a plurality of strands are twisted together, the cord strength is affected not only by the tensile strength of the individual filaments but also by strong contact among the strands due to cord tension. At the contact sites, the stress may be concentrated to their outermost layer filaments to cause preceding shear failure of the outermost layer filaments, thereby preventing increase in the cord strength comparable to the increase in the tensile strength of the individual filaments. In particular, such a preceding break phenomenon is frequently observed in filaments having a high tensile strength which are subject to shear failure, and especially in filaments having a tensile strength of not less than 3,040 N/mm$^2$, increase in the cord strength is suppressed as the tensile strength of the filaments increases, and in some cases, the cord strength even decreases due to long-term storage and/or the thermal history during production of a tire. In view of this, the present invention is intended for a steel cord having the above-described multi-twisted structure in which such a phenomenon has occurred in the past.

FIG. 1 is a cross-sectional view showing a steel cord for reinforcement of rubber articles as one example of the present invention. Preferred examples of the present invention include a steel cord having a (3+9+15)+8×(3+9)+1 structure as shown in the figure, wherein a core strand 1 having a layered twisted structure composed of:

a core having 3 core filaments 11;
a first sheath having 9 first sheath filaments 12 sequentially arranged around the circumference of the core; and
a second sheath having 15 second sheath filaments 13; is twisted together with 8 sheath strands 2 having a layered twisted structure composed of:

a core having 3 core filaments 14; and
9 first sheath filaments 15 sequentially arranged around the circumference of the core;
and around the resultant, a spiral filament 16 is further spirally wound. The spiral filament 16 is wound in order to strengthen a bundle of the cords, and is not indispensable and may be omitted in the present invention.

In the present invention, as shown in the figure, it is important for the above-described steel cord having a multi-twisted structure to have dc/ds, which represents the ratio between dc, the diameter of the second sheath filaments 13 constituting the outermost layer sheath of the core strand 1, and ds, the diameter of the first sheath filaments 15 constituting the outermost layer sheath of the sheath strands 2, of 1.05 to 1.25, preferably 1.05 to 1.20. This is because, by setting dc, the diameter of the outermost layer sheath filaments constituting the outermost layer sheath of the core strand where preceding break occurs, to not less than 1.05 times larger than ds, the diameter of the outermost layer sheath filaments constituting the outermost layer sheath of the sheath strands, the cross-sectional area of the filaments increases and the shear stress is reduced by the contact load, thereby suppressing the preceding break, so that the increase in the tensile strength of these filaments can be directly reflected to enhancement of the cord strength. However, in cases where the ratio exceeds 1.25, the filaments constituting the outermost layer sheath of the sheath strands become subject to preceding break, and the increase in the tensile strength of these filaments cannot be directly reflected to enhancement of the cord strength.

In the present invention, the twist angle of the sheath strands 2, among the strands constituting the cord, is preferably not less than 1.4 rad, especially preferably 1.40 to 1.50 rad. This is because, with a twist angle of the sheath strands 2 of less than 1.4 rad, the load bearing of the core strand 1 and the contact load from the sheath strands 2 become large under a tensile load, and therefore the cord strength largely decreases.

Further, in the present invention, the twist direction of the second sheath filaments 13 in the core strand 1 and the twist direction of the sheath strands 2 are preferably the same. This is because, by twisting them in the same direction together, the contact angle between the second sheath filaments 13 of the core strand 1 and the first sheath filaments 15 of the sheath strands 2 becomes small and the contacting area increases, leading to suppression of preceding break.

In the present invention, especially in the above-described steel cord having a multi-twisted structure, the tensile strength of all the filaments constituting each strand is preferably not less than 3,040 N/mm$^2$, more preferably in the range of 3,040 to 4,200 N/mm$^2$. With a tensile strength of the filaments of less than 3,040 N/mm$^2$, preceding break does not occur, so that application of the present invention is not necessary. The carbon content of the material of the filaments is preferably not less than 0.80% by weight.

Further, in the cord of the present invention, as long as the relationship between dc, the diameter of the outermost layer sheath filaments constituting the outermost layer sheath of the core strand 1, and ds, the diameter of outermost layer sheath filaments constituting the outermost layer sheath of the sheath strands 2, satisfies the above condition, other conditions such as the specific diameter, the twist direction and the twist pitch of each filament are not restricted, and the cord may be appropriately constituted according to a conventional method depending on its use.

As mentioned above, in the steel cord for reinforcement of rubber articles of the present invention, the cord strength is improved compared to conventional steel cords having a multi-twisted structure. Therefore, for example, in a pneumatic radial tire for construction vehicles wherein a ply, in which cords of the present invention were used instead of conventional steel cords having a multi-twisted structure and a plurality of the cords of the present invention were arranged in parallel each other and embedded in a rubber sheet, is applied to a belt or a carcass, all of weight saving, increase in the fuel efficiency and suppression of the cost of transportation can be realized.

Figure 2:
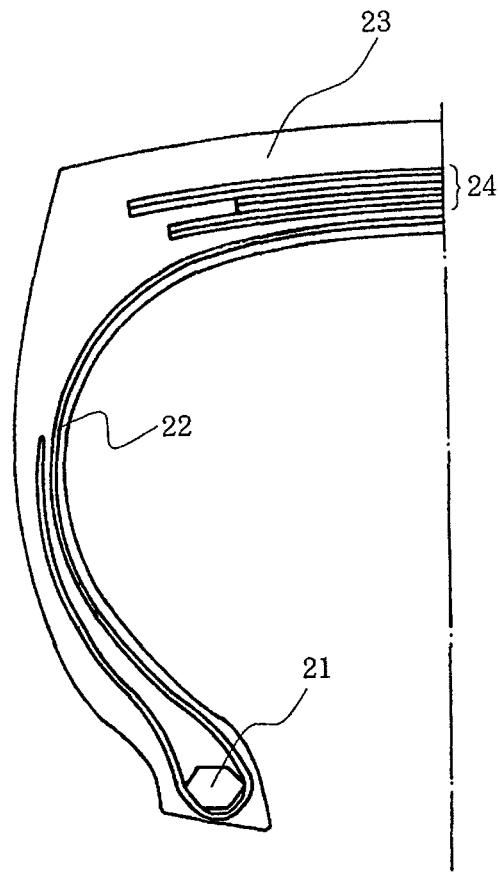
FIG. 2 is a magnified cross-sectional view showing a part of a pneumatic tire as one preferred example of the present invention.

Preferred examples of the pneumatic tire of the present invention include a large off-road radial tire having a tire size of about 40.00R57 as shown in FIG. 2. The tire shown in the figure has a layer of carcass ply 22 extending toroidally between bead cores 21 embedded respectively in a left-and-right pair of bead portions and 6 layers of belts 24 arranged in the outside of tread portion 23 in the radial direction of the tire. The steel cord of the present invention may be suitably applied to such a tire as a reinforcing material for the carcass ply 22 or the like. In this case, the end count of the cord for the carcass ply 22 may be, for example, in the range of 8.0 to 8.5 cords/50 mm, especially 8.0 cords/50 mm.

The pneumatic tire of the present invention may be one wherein the steel cord of the present invention is used as a reinforcing material for a carcass ply or a belt, and in terms of the other details of the tire structure, the material of each member and the like, those conventionally used may be appropriately employed and there is no restriction.

EXAMPLES

The present invention will be described in more detail by way of Examples.

Examples 1 to 3, Comparative Examples 1 to 8

According to the conditions shown in Tables 1 and 2 below, steel cords for reinforcement of rubber articles having a multi-twisted structure wherein 1+6 to 9 strands are twisted together, which strands have a layered twisted structure in which a plurality of steel filaments are twisted together, were prepared.

The steel cord shown in FIG. 1 is the cord of Example 1 most suitable for use as a reinforcing material for pneumatic tires, and has a cord structure of (3+9+15)+8×(3+9)+1. That is, the steel cord of Example 1 shown in the figure was formed by twisting 8 sheath strands 2 around a core strand 1, followed by spirally winding one spiral filament 16 around the resultant, wherein the core strand 1 was formed by twisting 9 first sheath filaments 12 and 15 second sheath filaments 13 around 3 core filaments 11 and the sheath strand 2 was formed by twisting 9 first sheath filaments 15 around 3 core filaments 14. The carbon content of each filament was 0.82% by weight.

The rate of reduction in the cord breaking strength by twisting was evaluated for each steel cord in Examples and Comparative Examples immediately after the production and after heating. Here, the rate of reduction by twisting (%) means the percentage of the difference between the total sum of the breaking strength of the filaments constituting the cord and the cord breaking strength. The immediately after production—after heating changing rate (%) was represented by the rate of change in the cord breaking strength based on comparison between that observed immediately after the production and that observed after heating at 145° C. for 40 minutes. When the rate of reduction by twisting is not more than 10% immediately after the production and the rate of reduction by twisting is not more than 15% after heating, reduction in the strength can be said to be small, which is good.

Results obtained by stopping the testing apparatus immediately before the complete break of the cord to observe the preceding break rate of each filament in the cord for the core strand outermost layer filaments, the sheath strand outermost layer filaments and the like are also shown in Tables 1 and 2 below.

TABLE 1

|  |  |  | Comparative Example 1 | Comparative Example 2 | Comparative Example 3 | Comparative Example 4 | Comparative Example 5 | Comparative Example 6) |
|---|---|---|---|---|---|---|---|---|
|  |  | Cord structure | 7 × (3 + 9 + 15) | 7 × (3 + 9 + 15) | 7 × (3 + 9 + 15) | (3 + 9 + 15) + 7 × (3 + 9 + 15) | (3 + 9 + 15) + 8 × (3 + 9 + 15) | (3 + 9 + 15) + 9 × (3 + 9 + 15) |
| Core strand | Core | Number | 3 | 3 | 3 | 3 | 3 | 3 |
|  |  | Diameter (mm) | 0.240 | 0.240 | 0.240 | 0.320 | 0.320 | 0.320 |
|  |  | Tensile strength (N/mm$^2$) | 2,849 | 3,542 | 3,542 | 3,231 | 3,231 | 3,231 |
|  |  | Pitch (mm) | 6.5 | 6.5 | 6.5 | 8.7 | 8.7 | 8.7 |
|  |  | Direction of twist | Z | Z | Z | Z | Z | Z |
|  | First sheath | Number | 9 | 9 | 9 | 9 | 9 | 9 |
|  |  | Diameter (mm) | 0.240 | 0.240 | 0.240 | 0.320 | 0.320 | 0.320 |
|  |  | Tensile strength (N/mm$^2$) | 2,849 | 3,542 | 3,542 | 3,231 | 3,231 | 3,231 |
|  |  | Pitch (mm) | 12.5 | 12.5 | 12.5 | 16.6 | 16.6 | 16.6 |
|  |  | Direction of twist | Z | Z | Z | Z | Z | Z |
|  | Second sheath | Number | 15 | 15 | 15 | 15 | 15 | 15 |
|  |  | Diameter dc (mm) | 0.240 | 0.240 | 0.240 | 0.320 | 0.320 | 0.320 |
|  |  | Tensile strength (N/mm$^2$) | 2,849 | 3,542 | 3,542 | 3,231 | 3,231 | 3,231 |
|  |  | Pitch (mm) | 19.0 | 19.0 | 19.0 | 25.5 | 25.5 | 25.5 |
|  |  | Direction of twist | Z | Z | Z | Z | Z | Z |
| Sheath strand | Core | Number | 3 | 3 | 3 | 3 | 3 | 3 |
|  |  | Diameter (mm) | 0.240 | 0.240 | 0.240 | 0.245 | 0.195 | 0.165 |
|  |  | Tensile strength (N/mm$^2$) | 2,849 | 3,542 | 3,542 | 3,590 | 3,631 | 3,645 |
|  |  | Pitch (mm) | 6.5 | 6.5 | 6.5 | 6.8 | 5.3 | 4.4 |
|  |  | Direction of twist | Z | Z | Z | Z | Z | Z |
|  | First sheath | Number | 9 | 9 | 9 | 9 | 9 | 9 |
|  |  | Diameter (mm) | 0.240 | 0.240 | 0.240 | 0.245 | 0.195 | 0.165 |
|  |  | Tensile strength (N/mm$^2$) | 2,849 | 3,542 | 3,542 | 3,590 | 3,631 | 3,645 |
|  |  | Pitch (mm) | 12.5 | 12.5 | 12.5 | 13.0 | 10.2 | 8.7 |
|  |  | Direction of twist | Z | Z | Z | Z | Z | Z |
|  | Second sheath | Number | 15 | 15 | 15 | 15 | 15 | 15 |
|  |  | Diameter ds (mm) | 0.240 | 0.240 | 0.240 | 0.245 | 0.195 | 0.165 |
|  |  | Tensile strength (N/mm$^2$) | 2,849 | 3,542 | 3,542 | 3,590 | 3,631 | 3,645 |
|  |  | Pitch (mm) | 19.0 | 19.0 | 19.0 | 19.1 | 15.0 | 12.8 |
|  |  | Direction of twist | Z | Z | Z | Z | Z | Z |
|  | Ratio between diameters of outermost layer filaments: dc/ds | | 1.00 | 1.00 | 1.00 | 1.306 | 1.641 | 1.939 |
|  | Total strength of filaments (N) | | 24,358 | 30,286 | 30,286 | 39,001 | 30,437 | 25,954 |
| Sheath strand | | Pitch (mm) | 61.0 | 61.0 | 61.0 | 72.6 | 64.1 | 61.4 |
|  |  | Direction of twist | S | S | Z | Z | Z | Z |
|  |  | Twist angle (rad) | 1.418 | 1.418 | 1.418 | 1.421 | 1.417 | 1.419 |
| Immediately after production | | Cord breaking strength (N) | 22,994 | 23,835 | 25,016 | 34,757 | 25,990 | 21,657 |
|  |  | Rate of reduction by twisting (%) | 5.6 | 21.3 | 17.4 | 10.9 | 14.6 | 16.6 |
| After heating | | Cord breaking strength (N) | 23,067 | 22,684 | 22,805 | 31,443 | 24,673 | 21,530 |
|  |  | Rate of reduction by twisting (%) | 5.3 | 25.1 | 24.7 | 19.4 | 18.9 | 17.0 |
|  | Immediately after production - after heating changing rate (%) | | 0.3 | −4.8 | −8.8 | −9.5 | −5.1 | −0.6 |
| Rate of preceding break | Core strand outermost layer filament (%) | | — | 100 | 85.7 | 3.4 | 0.0 | 0.0 |

TABLE 1-continued

|  | | Comparative Example 1 | Comparative Example 2 | Comparative Example 3 | Comparative Example 4 | Comparative Example 5 | Comparative Example 6) |
|---|---|---|---|---|---|---|---|
|  | Sheath strand outermost layer filament (%) | — | 0.0 | 0.0 | 93.1 | 100 | 100 |
|  | Others (%) | — | 0.0 | 14.7 | 35 | 0.0 | 0.0 |

TABLE 2

| | | | Comparative Example 7 | Comparative Example 8 | Example 1 | Example 2 | Example 3 |
|---|---|---|---|---|---|---|---|
| | | Cord structure | (3 + 9 + 15) + 7 × (3 + 9) | (3 + 9 + 15) + 9 × (3 + 9) | (3 + 9 + 15) + 8 × (3 + 9) | (3 + 9 + 12) + 7 × (3 + 9) | (3 + 9 + 11) + 7 × (3 + 9) |
| Core strand | Core | Number | 3 | 3 | 3 | 3 | 3 |
| | | Diameter (mm) | 0.320 | 0.320 | 0.320 | 0.260 | 0.250 |
| | | Tensile strength (N/mm$^2$) | 3,231 | 3,231 | 3,231 | 3,363 | 3,412 |
| | | Pitch (mm) | 8.7 | 8.7 | 8.7 | 7.1 | 6.8 |
| | | Direction of twist | Z | Z | Z | Z | Z |
| | First sheath | Number | 9 | 9 | 9 | 9 | 9 |
| | | Diameter (mm) | 0.320 | 0.320 | 0.320 | 0.260 | 0.250 |
| | | Tensile strength (N/mm$^2$) | 3,231 | 3,231 | 3,231 | 3,363 | 3,412 |
| | | Pitch (mm) | 16.6 | 16.6 | 16.6 | 13.5 | 13.0 |
| | | Direction of twist | Z | Z | Z | Z | Z |
| | Second sheath | Number | 15 | 15 | 15 | 12 | 11 |
| | | Diameter dc (mm) | 0.320 | 0.320 | 0.320 | 0.350 | 0.375 |
| | | Tensile strength (N/mm$^2$) | 3,231 | 3,231 | 3,231 | 3,085 | 2,961 |
| | | Pitch (mm) | 25.5 | 25.5 | 25.5 | 21.6 | 21.6 |
| | | Direction of twist | Z | Z | Z | Z | Z |
| Sheath strand | Core | Number | 3 | 3 | 3 | 3 | 3 |
| | | Diameter (mm) | 0.360 | 0.245 | 0.290 | 0.325 | 0.325 |
| | | Tensile strength (N/mm$^2$) | 3,209 | 3,590 | 3,441 | 3,245 | 3,245 |
| | | Pitch (mm) | 6.5 | 6.5 | 6.5 | 8.7 | 8.7 |
| | | Direction of twist | Z | Z | Z | Z | Z |
| | First sheath | Number | 9 | 9 | 9 | 9 | 9 |
| | | Diameter ds (mm) | 0.360 | 0.245 | 0.290 | 0.325 | 0.325 |
| | | Tensile strength (N/mm$^2$) | 3,209 | 3,590 | 3,441 | 3,245 | 3,245 |
| | | Pitch (mm) | 12.5 | 12.5 | 12.5 | 17.4 | 17.4 |
| | | Direction of twist | Z | Z | Z | Z | Z |
| Ratio between diameters of outermost layer filaments: dc/ds | | | 0.889 | 1.306 | 1.103 | 1.077 | 1.154 |
| | | Total strength of filaments (N) | 34,449 | 25,293 | 28,836 | 28,314 | 28,217 |
| Sheath strand | | Pitch (mm) | 69.6 | 61.4 | 64.1 | 64.1 | 64.1 |
| | | Direction of twist | Z | Z | Z | Z | Z |
| | | Twist angle (rad) | 1.416 | 1.419 | 1.416 | 1.420 | 1.420 |
| Immediately after production | | Cord breaking strength (N) | 31,783 | 22,697 | 26,490 | 26,383 | 26,313 |
| | | Rate of reduction by twisting (%) | 7.7 | 10.3 | 8.1 | 6.8 | 6.7 |
| After heating | | Cord breaking strength (N) | 29,007 | 21,253 | 24,757 | 24,750 | 24,413 |
| | | Rate of reduction by twisting (%) | 15.8 | 16.0 | 14.1 | 12.6 | 13.5 |
| Immediately after production - after heating changing rate (%) | | | −8.7 | −6.4 | −6.5 | −6.2 | −7.2 |
| Rate of preceding break | Core strand outermost layer filament (%) | | 88.9 | 0.0 | 33.3 | 54.5 | 34.4 |
| | Sheath strand outermost layer filament (%) | | 11.1 | 100 | 66.7 | 9.1 | 3.1 |
| | Others (%) | | 0 | 0 | 0 | 36.4 | 62.5 |

As shown in the above Tables 1 and 2, in the steel cords for reinforcement of rubber articles in Examples 1 to 3 having the predetermined multi-twisted structure wherein dc/ds, which represents the ratio between dc, the diameter of outermost layer sheath filaments constituting the outermost layer sheath of the core strand, and ds, the diameter of the outermost layer sheath filaments constituting the outermost layer sheath of the sheath strands, was set to 1.05 to 1.25, it was confirmed that the rate of reduction by twisting was small immediately after the production and therefore a high cord strength could be realized, and that, since the rate of reduction by twisting was small also after the heating, the reduction of the cord strength was small even after the heating.

Figure 3:
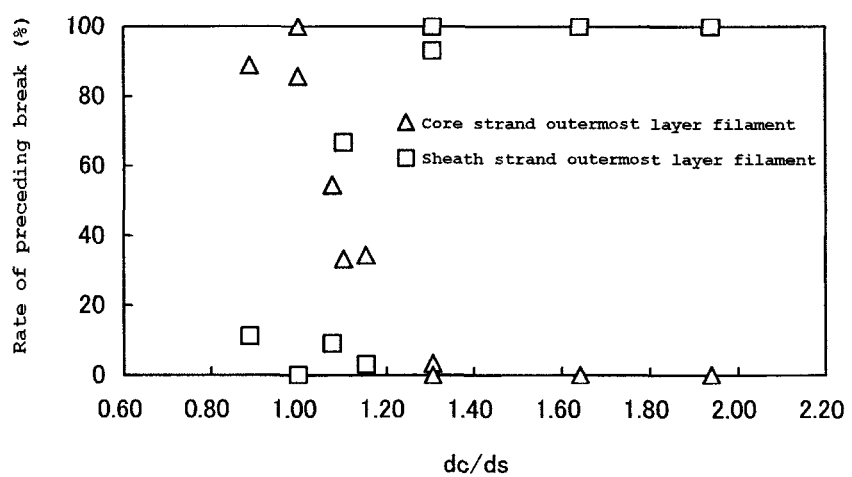
FIG. 3 is a graph showing the relationship between dc/ds and the rate of preceding break.

FIG. 3 is a graph showing the relationships between dc/ds and the rates of preceding break in Examples 1 to 3 and Comparative Examples 1 to 8. As shown in FIG. 3, in terms of the rate of preceding break of the filaments in the cord immediately before the complete break of the cord, preceding break occurred in mostly the core strand outermost layer filaments at dc/ds of not more than 1.00, while the other filaments began to undergo preceding break at dc/ds of not less than 1.30. It can be seen also from this graph that, to obtain a high cord strength, it is important to avoid concentration of preceding break to specific filaments, and that dc/ds within the range of 1.05 to 1.25 is appropriate.

DESCRIPTION OF SYMBOLS

1. Core strand
2. Sheath strand
11. Core strand core filament
12. Core strand first sheath filament
13. Core strand second sheath filament (outermost layer sheath filament)
14. Sheath strand core filament
15. Sheath strand first sheath filament (outermost layer sheath filament)
16. Spiral filament
21. Bead core
22. Carcass ply
23. Tread portion
24. Belt
dc The diameter of each outermost layer sheath filament in the core strand
ds The diameter of each outermost layer sheath filament in the sheath strand

The invention claimed is:

1. A steel cord for reinforcement of rubber articles, having a multi-twisted structure in which a plurality of strands are twisted together, said strands having a layered twisted structure in which a plurality of steel filaments are twisted together, wherein dc/ds, which represents the ratio between dc, the diameter of each outermost layer sheath filament constituting the outermost layer sheath of a core strand, and ds, the diameter of each outermost layer sheath filament constituting the outermost layer sheath of sheath strands, is 1.05 to 1.25, wherein said core strand consists of a core, a first sheath, and a second sheath, and said sheath strands consist of a core and a first sheath, wherein the number of said core strand is only one, wherein the twist angle of the sheath strand, among said strands, is not less than 1.4 rad, and wherein the core strand has a structure of 3+9+11 filaments.

2. The steel cord for reinforcement of rubber articles according to claim 1, wherein the direction of twist of the outermost layer sheath filaments constituting the outermost layer sheath of said core strand and the direction of twist of said sheath strands are the same.

3. The steel cord for reinforcement of rubber articles according to claim 1, wherein the tensile strength of all the filaments constituting said strands are not less than 3,040 $N/mm^2$.

4. The steel cord for reinforcement of rubber articles according to claim 1, wherein the carbon contents of the filaments constituting said strands are not less than 0.80% by weight.

5. A pneumatic tire wherein the steel cord for reinforcement of rubber articles according to claim 1 is employed as a reinforcing material.

* * * * *